(12) United States Patent
Mandalia et al.

(10) Patent No.: US 7,921,158 B2
(45) Date of Patent: Apr. 5, 2011

(54) USING A LIST MANAGEMENT SERVER FOR CONFERENCING IN AN IMS ENVIRONMENT

(75) Inventors: Baiju D. Mandalia, Boca Raton, FL (US); Victor S. Moore, Lake City, FL (US); Wendi L. Nusbickel, Boca Raton, FL (US); Susan R. Wallenborn, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 11/691,642

(22) Filed: Mar. 27, 2007

(65) Prior Publication Data
US 2007/0185957 A1 Aug. 9, 2007

Related U.S. Application Data

(63) Continuation-in-part of application No. 11/680,304, filed on Feb. 28, 2007, and a continuation-in-part of application No. 11/297,536, filed on Dec. 8, 2005.

(51) Int. Cl.
*G06F 13/00* (2006.01)
(52) U.S. Cl. .................... 709/205; 709/228; 719/318
(58) Field of Classification Search ................ 709/204, 709/205, 227, 228; 719/318
See application file for complete search history.

(56) References Cited

U.S. PATENT DOCUMENTS

| | | | |
|---|---|---|---|
| 5,278,943 A | 1/1994 | Casper et al. | |
| 5,774,551 A | 6/1998 | Wu et al. | |
| 5,781,720 A | 7/1998 | Parker et al. | |
| 5,873,094 A | 2/1999 | Talatik | |
| 6,195,697 B1 | 2/2001 | Bowman-Amuah | |
| 6,269,336 B1 | 7/2001 | Ladd et al. | |
| 6,272,625 B1 | 8/2001 | DeCarmo | |
| 6,298,370 B1 | 10/2001 | Tang et al. | |
| 6,301,609 B1 | 10/2001 | Aravamudan et al. | |
| 6,317,794 B1 | 11/2001 | Papierniak et al. | |

(Continued)

FOREIGN PATENT DOCUMENTS

CN 1697419 11/2005

(Continued)

OTHER PUBLICATIONS

Kimbrough, S.O., et al., "On Automated Message Processing in Electronic Commerce and Work Support Systems: Speech Act Theory and Expressive Felicity", ACM Transactions on Information Systems, vol. 15, No. 4, pp. 321-367, Oct. 1997.

(Continued)

*Primary Examiner* — Viet Vu
(74) *Attorney, Agent, or Firm* — Patents on Demand, P.A.; Brian K. Buchheit; Scott M. Garrett (57) ABSTRACT

The present invention uses a list management server for specifying conference participants in an IMS environment. More specifically, a conference list can be established for a standard list management server. The conference list can be a group list that is identified with a unique public URI. The group list can include multiple members, where each member can be identified by a member URI. Members can be specific participants associated with a user specific URI and/or can be a group of participants. When the conference is initiated, a new communication session can be instantiated and a conferencing application execute. After session instantiation, participants included in the conference list can join the session.

18 Claims, 4 Drawing Sheets

U.S. PATENT DOCUMENTS

| | | |
|---|---|---|
| 6,338,089 B1 | 1/2002 | Quinlan |
| 6,351,271 B1 | 2/2002 | Mainwaning et al. |
| 6,366,771 B1 | 4/2002 | Angle et al. |
| 6,370,508 B2 | 4/2002 | Beck et al. |
| 6,442,547 B1 | 8/2002 | Bowman-Amuah |
| 6,523,035 B1 | 2/2003 | Fleming et al. |
| 6,587,558 B2 | 7/2003 | Lo et al. |
| 6,606,744 B1 | 8/2003 | Mikurak |
| 6,611,867 B1 | 8/2003 | Bowman-Amuah |
| 6,618,490 B1 | 9/2003 | Cham et al. |
| 6,662,340 B2 | 12/2003 | Rawat et al. |
| 6,704,396 B2 | 3/2004 | Parolkar et al. |
| 6,724,403 B1 | 4/2004 | Santoro et al. |
| 6,735,287 B2 | 5/2004 | Vishnik et al. |
| 6,735,566 B1 | 5/2004 | Brand |
| 6,757,362 B1 | 6/2004 | Cooper et al. |
| 6,810,429 B1 | 10/2004 | Walsh et al. |
| 6,895,084 B1 | 5/2005 | Saylor et al. |
| 6,898,277 B1 | 5/2005 | Meteer et al. |
| 6,898,658 B2 | 5/2005 | Toguchi et al. |
| 6,910,074 B1 | 6/2005 | Amin et al. |
| 6,922,466 B1 | 7/2005 | Peterson et al. |
| 6,970,554 B1 | 11/2005 | Peterson et al. |
| 6,972,761 B1 | 12/2005 | Cox et al. |
| 6,978,247 B1 | 12/2005 | Bogart et al. |
| 6,988,126 B2 | 1/2006 | Wilcock et al. |
| 6,996,605 B2 | 2/2006 | Low et al. |
| 7,003,079 B1 | 2/2006 | McCarthy et al. |
| 7,023,840 B2 | 4/2006 | Golla et al. |
| 7,085,728 B2 | 8/2006 | Sarlay et al. |
| 7,149,798 B2 | 12/2006 | Rezvani et al. |
| 7,177,881 B2 | 2/2007 | Schwesig et al. |
| 7,203,907 B2 | 4/2007 | Weng et al. |
| 7,210,098 B2 | 4/2007 | Sibal et al. |
| 7,233,933 B2 | 6/2007 | Horvitz et al. |
| 7,286,840 B2 | 10/2007 | Jain |
| 7,315,616 B2 | 1/2008 | Annadata et al. |
| 7,330,487 B2 | 2/2008 | Chang et al. |
| 7,334,018 B2 | 2/2008 | Elms |
| 7,336,628 B2 | 2/2008 | Chang et al. |
| 7,337,405 B2 | 2/2008 | Weng et al. |
| 7,356,567 B2 | 4/2008 | Odell et al. |
| 7,418,094 B2 * | 8/2008 | Golitsin et al. .......... 379/265.12 |
| 7,441,261 B2 | 10/2008 | Slater et al. |
| 7,499,458 B2 | 3/2009 | McDysan et al. |
| 7,506,368 B1 | 3/2009 | Kersey et al. |
| 7,525,937 B2 | 4/2009 | O'Neill |
| 7,567,662 B1 * | 7/2009 | Renner et al. ............ 379/202.01 |
| 2001/0027474 A1 | 10/2001 | Nachman et al. |
| 2001/0034738 A1 | 10/2001 | Cantwell et al. |
| 2001/0052023 A1 | 12/2001 | Lin et al. |
| 2002/0016736 A1 | 2/2002 | Cannon et al. |
| 2002/0052932 A1 | 5/2002 | Curtis et al. |
| 2002/0055350 A1 | 5/2002 | Gupte et al. |
| 2002/0055967 A1 | 5/2002 | Coussement |
| 2002/0056000 A1 | 5/2002 | Coussement |
| 2002/0089539 A1 | 7/2002 | Lindhorst et al. |
| 2002/0099602 A1 | 7/2002 | Moskowitz et al. |
| 2002/0103867 A1 | 8/2002 | Schilter |
| 2002/0105909 A1 | 8/2002 | Flanagan et al. |
| 2002/0120674 A1 | 8/2002 | Son et al. |
| 2002/0140731 A1 | 10/2002 | Subramaniam et al. |
| 2002/0154162 A1 | 10/2002 | Bhatia et al. |
| 2002/0169613 A1 | 11/2002 | Damiba |
| 2002/0184346 A1 | 12/2002 | Mani |
| 2002/0184373 A1 | 12/2002 | Maes |
| 2002/0184610 A1 | 12/2002 | Chong et al. |
| 2002/0187750 A1 | 12/2002 | Majumdar |
| 2002/0194388 A1 | 12/2002 | Boloker et al. |
| 2003/0023953 A1 | 1/2003 | Lucassen et al. |
| 2003/0026269 A1 | 2/2003 | Paryani |
| 2003/0040995 A1 | 2/2003 | Daddario et al. |
| 2003/0041108 A1 | 2/2003 | Henrick et al. |
| 2003/0046088 A1 | 3/2003 | Yuschik |
| 2003/0055884 A1 | 3/2003 | Yuen et al. |
| 2003/0088421 A1 | 5/2003 | Maes et al. |
| 2003/0095540 A1 | 5/2003 | Mulligan et al. |
| 2003/0108063 A1 | 6/2003 | Joseph et al. |
| 2003/0110297 A1 | 6/2003 | Tabatabai et al. |
| 2003/0120813 A1 | 6/2003 | Majumdar et al. |
| 2003/0182622 A1 | 9/2003 | Sibal et al. |
| 2003/0187944 A1 | 10/2003 | Johnson et al. |
| 2003/0204561 A1 | 10/2003 | Briscoe et al. |
| 2003/0212762 A1 | 11/2003 | Barnes et al. |
| 2003/0223381 A1 | 12/2003 | Schroderus |
| 2004/0039795 A1 | 2/2004 | Percival |
| 2004/0054740 A1 | 3/2004 | Daigle et al. |
| 2004/0078787 A1 | 4/2004 | Borek et al. |
| 2004/0104938 A1 | 6/2004 | Saraswat et al. |
| 2004/0128342 A1 | 7/2004 | Maes et al. |
| 2004/0133888 A1 | 7/2004 | Ard et al. |
| 2004/0146010 A1 | 7/2004 | Gass et al. |
| 2004/0172254 A1 | 9/2004 | Sharma et al. |
| 2004/0172258 A1 | 9/2004 | Dominach et al. |
| 2004/0181461 A1 | 9/2004 | Raiyani et al. |
| 2004/0199529 A1 | 10/2004 | Clark et al. |
| 2004/0199574 A1 | 10/2004 | Franco et al. |
| 2004/0205614 A1 | 10/2004 | Keswa |
| 2004/0215824 A1 | 10/2004 | Payrits |
| 2004/0230466 A1 | 11/2004 | Davis et al. |
| 2004/0239754 A1 | 12/2004 | Shachar |
| 2004/0250201 A1 | 12/2004 | Caspi |
| 2004/0254957 A1 | 12/2004 | Hyotyniemi et al. |
| 2004/0255030 A1 | 12/2004 | Sillanpaa |
| 2005/0021826 A1 | 1/2005 | Kumar |
| 2005/0027495 A1 | 2/2005 | Matichuk |
| 2005/0047579 A1 | 3/2005 | Salame |
| 2005/0060138 A1 | 3/2005 | Wang et al. |
| 2005/0069225 A1 | 3/2005 | Schneider et al. |
| 2005/0102606 A1 | 5/2005 | Sasaki et al. |
| 2005/0125541 A1 | 6/2005 | Frank et al. |
| 2005/0129198 A1 | 6/2005 | Sudhir et al. |
| 2005/0132023 A1 | 6/2005 | Cazzolla et al. |
| 2005/0136897 A1 | 6/2005 | Praveenkumar et al. |
| 2005/0137875 A1 | 6/2005 | Kim et al. |
| 2005/0147216 A1 | 7/2005 | Janakiraman et al. |
| 2005/0152522 A1 | 7/2005 | Kumhyr |
| 2005/0172331 A1 | 8/2005 | Blackketter et al. |
| 2005/0198099 A1 | 9/2005 | Motsinger et al. |
| 2005/0203944 A1 | 9/2005 | Dinh et al. |
| 2005/0251393 A1 | 11/2005 | Georgescu |
| 2005/0261909 A1 | 11/2005 | Sienel et al. |
| 2005/0278444 A1 | 12/2005 | Sims et al. |
| 2005/0283364 A1 | 12/2005 | Longe et al. |
| 2006/0015600 A1 | 1/2006 | Piper |
| 2006/0023864 A1 | 2/2006 | Krahn |
| 2006/0031077 A1 | 2/2006 | Dalton et al. |
| 2006/0036770 A1 | 2/2006 | Hosn et al. |
| 2006/0069563 A1 | 3/2006 | Ju et al. |
| 2006/0074980 A1 | 4/2006 | Sarkar |
| 2006/0101143 A1 * | 5/2006 | Garcia et al. .................. 709/225 |
| 2006/0112400 A1 | 5/2006 | Zhang et al. |
| 2006/0168002 A1 | 7/2006 | Chesley |
| 2006/0195584 A1 | 8/2006 | Baumann |
| 2006/0200569 A1 | 9/2006 | Koch et al. |
| 2006/0200754 A1 | 9/2006 | Kablesh et al. |
| 2006/0212511 A1 | 9/2006 | Garcia-Martin |
| 2006/0282856 A1 | 12/2006 | Errico et al. |
| 2006/0287866 A1 | 12/2006 | Cross et al. |
| 2007/0005990 A1 | 1/2007 | Sathish |
| 2007/0026852 A1 | 2/2007 | Logan et al. |
| 2007/0047715 A1 * | 3/2007 | Madhusudan et al. ... 379/202.01 |
| 2007/0049281 A1 | 3/2007 | Chen et al. |
| 2007/0081557 A1 | 4/2007 | Binetti et al. |
| 2007/0100790 A1 | 5/2007 | Adamczyk et al. |
| 2007/0109979 A1 * | 5/2007 | Fu et al. ........................ 370/261 |
| 2007/0116223 A1 | 5/2007 | Burke et al. |
| 2007/0124507 A1 | 5/2007 | Gurram et al. |
| 2007/0132834 A1 | 6/2007 | DaPalma et al. |
| 2007/0133507 A1 | 6/2007 | DaPalma et al. |
| 2007/0133508 A1 | 6/2007 | DaPalma et al. |
| 2007/0133509 A1 | 6/2007 | Da Palma et al. |
| 2007/0133511 A1 | 6/2007 | DaPalma et al. |
| 2007/0133512 A1 | 6/2007 | Da Palma et al. |
| 2007/0133513 A1 | 6/2007 | Da Palma et al. |
| 2007/0133769 A1 | 6/2007 | DaPalma et al. |
| 2007/0136420 A1 | 6/2007 | Da Palma et al. |

| | | | |
|---|---|---|---|
| 2007/0136421 | A1 | 6/2007 | DaPalma et al. |
| 2007/0136436 | A1 | 6/2007 | DaPalma et al. |
| 2007/0136442 | A1 | 6/2007 | DaPalma et al. |
| 2007/0136448 | A1 | 6/2007 | DaPalma et al. |
| 2007/0136449 | A1 | 6/2007 | DaPalma et al. |
| 2007/0136793 | A1 | 6/2007 | DaPalma et al. |
| 2007/0147355 | A1 | 6/2007 | DaPalma et al. |
| 2007/0180075 | A1 | 8/2007 | Chasman et al. |
| 2007/0266075 | A1 | 11/2007 | Jachner |
| 2008/0003964 | A1 | 1/2008 | Alperin et al. |
| 2008/0037752 | A1* | 2/2008 | Chatilov et al. .......... 379/202.01 |
| 2008/0192908 | A1 | 8/2008 | O'Keefe et al. |

FOREIGN PATENT DOCUMENTS

| | | |
|---|---|---|
| EP | 1199872 | 4/2002 |
| EP | 1237349 A2 | 9/2002 |
| EP | 1484903 A2 | 12/2004 |
| FR | 2844127 A1 | 3/2004 |
| WO | 0005903 | 2/2000 |
| WO | 0131472 | 5/2001 |
| WO | 03079144 | 9/2003 |
| WO | 2004064321 A1 | 7/2004 |

OTHER PUBLICATIONS

Brabrand, C., et al., "The <bigwig> Project", ACM Transactions on Internet Technology, vol. 2, No. 2, pp. 79-114, May 2002.

Fielding, R.T., et al., "Principled Design of the Modern Web Architecture", ACM Transactions on Internet Technology, vol. 2, No. 2, pp. 115-150, May 2002.

Meng, H., et al., "ISIS: An Adaptive, Trilingual Conversational System With Interleaving Interaction and Delegation Dialogs", ACM Transactions on Computer Human Interaction, vol. 11, No. 3, pp. 268-299, Sep. 2004.

Atkins, D., et al., "Common Presence and Instant Messaging: Message Format," [online] Internet Engineering Task Force, IETF, CH vol. IMMP, No. 8, Jan. 9, 2003, [retrieved on Feb. 7, 2008] retrieved from the Internet: <http://tools.ietf.org/html/draft-ietf-impp-cpim-msgfmt-08>.

Peterson, J., "Common Profile for Presence (CPP)," [online] Internet Engineering Task Force, IETF, CH, vol. IMPP, No. 4, Aug. 14, 2003, [retrieved on Feb. 7, 2008] retrieved from the Internet: <http://tools.ietf.org/html/draft-ietf-impp-pres-04>.

Sugano, H., et al., "Prsence Information Data Format (PIDF)," [online] Internet Engineering Task Force, IETF, CH, vol. IMPP, No. 8, May 1, 2003, [retrieved on Feb. 7, 2008] retrieved from the Internet: <http://tools.ietf.org/html/draft-ietf-impp-cpim-pidf-08>.

Schulzrinne, H., et al., "RPID: Rich Presence Extensions to the Presence Information Data Format (PIDF)," [online] Internet Engineering Task Force, IETF, CH, Jul. 1, 2006, [retrieved on Feb. 7, 2008] retrieved from the Internet: <http://www.ietf.org/rfc/rfc4480.txt>.

Notice of Allowance dated Dec. 9, 2009 in related application, U.S. Appl. No. 11/684,397.

Keidl, M., et al., "Flexible and Reliable Web Service Execution," [online] Proc. of Workshop on Entwicklung von Anwendungen auf der Basis der XML Web-Service Technologies, retrieved from the Internet: <http://citeseerx.ist.psu.edu/viewdoc/summary?doi=10.1.1.8.8890>.

Engelsma, J., et al., Distributed Multimodal Synchronization Protocol; IETF Standard-Working Draft, Internet Engineering Task Force, IETF, CH, Jul. 8, 2005, pp. 1-71.

Georgescu, J.C., et al. "Multimodal IMS Services: The Adaptive Keyword Spotting Interaction Paradigm," [online] ICAS-ICNS 2005, Int'l Conf. Autonomic and Autonomous Systems / Int'l Conf. on Networking and Services pp. 21, 2005 [retrieved Jun. 4, 2010] retrieved from the Internet: <http://www.computer.org/portal/web/csdl/doi/10.1109/ICAS-ICNS.2005.67>.

Bodel, M., et al., "W3C Multimodal Interaction Citation," [online] May 6, 2003, pp. 1-19, XP002305381; [retrieved Jun. 4, 2010] retrieved from the Internet: <http://www.w3.org/TR/mmi-framework/>.

US Pat. No. 7706521, Office Action 1, Dec. 30, 2008.
US Pat. No. 7706521, Office Action 2, Jul. 2, 2009.
US Pub. No. 20070133773, Office Action 1, Dec. 9, 2008.
US Pub. No. 20070133773, Final Office Action 1, May 29, 2009.
US Pub. No. 20070133773, Final Office Action 1, May 21, 2010.
US Pub. No. 20070133509, Office Action 1, Dec. 10, 2008.
US Pub. No. 20070133509, Final Office Action 1, Jun. 24, 2009.
US Pub. No. 20070133513, Office Action 1, Feb. 26, 2010.

* cited by examiner

USING A LIST MANAGEMENT SERVER FOR CONFERENCING IN AN IMS ENVIRONMENT

CROSS-REFERENCE TO RELATED APPLICATIONS

This continuation-in-part application claims the benefit of U.S. patent application Ser. No. 11/680,304 filed 28 Feb. 2007, and U.S. patent application Ser. No. 11/297,536 filed 8 Dec. 2005, which are hereby incorporated by reference herein.

BACKGROUND

1. Field of the Invention

The present invention relates to the field of IP Multimedia Subsystem (IMS) conferencing and, more particularly, to using a list management server for specifying conferencing participants in an IMS environment.

2. Description of the Related Art

A list management server creates and manages network-based group definitions and associated lists of members for defined groups. The list management server can maintain access lists, permissions, and other service specific properties associated with groups and group members. Use of a list management server permits a user's contact list, such as an email list of a personal address book, to be specified and used in an application independent manner. This can allow a user's contact list to be used by an email program at work and at home, by a mobile telephony device of the user, and the like. List management servers also support group list nesting so that one list can be referenced within another. The list management server further permits multiple users to share lists, such as sharing contact lists among employees in a company. Numerous standards exist to ensure compatibility of server managed lists, such as the XML Configuration Access Protocol (XCAP) standard of the Internet Engineering Task Force (IETF).

At present, list management servers are not used for conferencing purposes. Instead, communication conferences are typically implemented using proprietary software/hardware. For example, different service providers implement conferencing in a provider specific manner. This prevents applications from handling conferences in a unified manner, which can lead to incompatibilities. For instance, two partnering entities can be working together on a project which requires coordination with other entities. The partners can each coordinate with a set of contractors working on the project or a set of customers. Further, the partners can use different telecommunication service providers. When establishing conferences, each party can desire to handle its own contacts and to permit them to join a common conference, which many not be possible due to the proprietary manner in which each service provider handles conferences. It would be much more convenient if each partner could define a set of conference participants and then join these lists for a conference, which could be handled by either service provider. This is not currently possible. Conferencing capability problems will become increasingly significant in the future as different communication mediums converge and as expanded communication services are provided by different providers. For example, it is anticipated that future conferences can include participants using different participant selected interface modalities.

Conference centers have conventionally used proprietary hardware/software for implementing their functions. Contact centers, for example, often have conferencing capabilities where a supervisor is able to selectively join a live communication session involving a contact center agent and a caller. This conferencing capability is implemented in a vendor specific manner for vendor specific hardware and software, which results in a silo-ed solution. Different vendor solutions are incompatible with each other and other different capabilities. For example, one vendor may permit silent supervisor conferencing for monitoring purposes and a different vendor may permit a participating agent to add another agent to a session, such as when additional expertise is needed. Neither vendor may implement both agent directed conferencing and silent supervisor conferencing, which can be problematic for customers wanting both capabilities.

SUMMARY OF THE INVENTION

The present invention uses a list management server for specifying conference participants in an IMS environment. More specifically, a conference list can be established for a standard list management server. The conference list can be a group list that is identified with a unique public Uniform Resource Identifier (URI). The group list can include multiple members, where each member can be identified by a member URI. Each member can be a specific participant associated with a user specific URI and/or can be a group of participants (e.g., a member of a conference can be a separate conferencing group). Hence the invention can support nesting of participants and conferencing groups. Each conference list can have a conference owner, who initiates a conference. When the conference is initiated, a new communication session can be instantiated and a conferencing application executed. After session instantiation, participants included in the conference list can join the session. In one embodiment, the session owner can be a software agent that automatically establishes a conference-enabled session instance at a previously designated time and/or responsive to the first participant in the conferencing list attempting to join a conference.

Unlike many conferencing solutions in use today, the present invention is a highly flexible, standards based solution. The present invention can operate within an IP Multimedia Subsystem (IMS) environment. The conferencing application can be a composite services application, which permits each conference participant to select a modality with which they interact during the conference. This modality can be specified within a participant specific attribute managed by the list management server. In one embodiment, the present invention can be a conferencing component of a standards based conference center.

The present invention can be implemented in accordance with numerous aspects consistent with the material presented herein. For example, one aspect of the present invention can include a method of conferencing communication participants in a standards based IMS environment. IN the method, a conference session identifier can be created within a list management server. Multiple participant identifiers can be associated with the conference session identifier. The conference session identifier and the participant identifiers can each be a Uniform Resource Identifier (URI) unique within the list management server. A conference application associated with the conference session identifier can execute, which initiates a conference that includes a participant associated with each of the participant identifiers.

Another aspect of the present invention can include a method for conferencing in an IMS environment. The method can establish a conference group with a list management server. The conference group can include one or more attributes, one of which is a session identifier. One or more conference participants can subscribe to the session identifier.

A conferencing application can initiate a conferencing session. The session can have an associated conferencing session identifier. The conference application can change a value of the session identifier to the value of the conferencing session identifier. Responsive the changing step, the list management server can automatically convey a notification of the change that includes the conferencing session identifier to the subscribed conference participants. Each of the conference participants are then able to join in the conferencing session by responding to a received notification.

Still another aspect of the present invention can include a system for real-time conferencing that includes a list management server and at least one conferencing application. The list management server can create and manage network-based group definitions and associated lists of members of those groups. The list management server can also manage conference groups including conference participants. Each participant can be associated with a communication device having a unique URI. The URI can be used by the list management server to identify the associated conference participant. The conferencing application can initialize a conference session having participants specified by the list management server.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, and optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
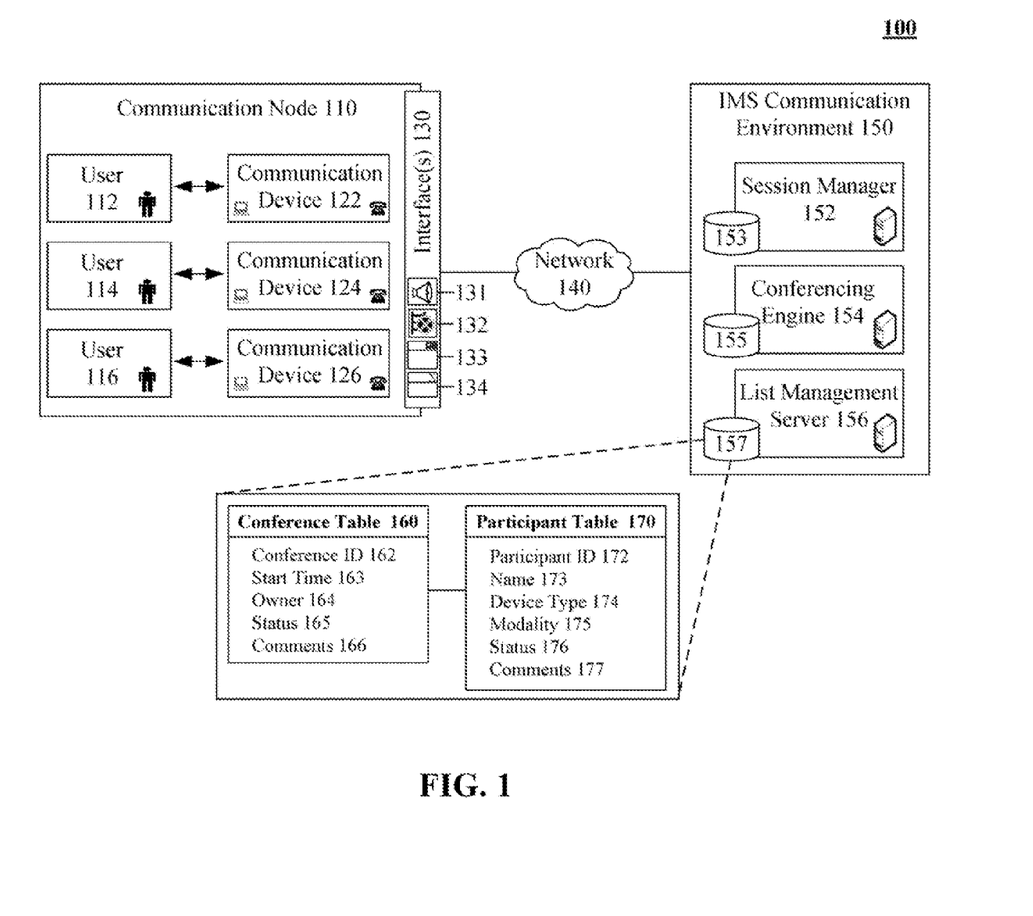
FIG. 1 is a schematic diagram of a system in which a list management server specifies conference membership for IP Multimedia Subsystem (IMS) based conferencing sessions in accordance with an embodiment of the inventive arrangements disclosed herein.

FIG. 1 is a schematic diagram of a system 100 in which a list management server 156 specifies conference membership for IP Multimedia Subsystem (IMS) based conferencing sessions in accordance with an embodiment of the inventive arrangements disclosed herein. In system 100, one or more communication nodes 110 can be communicatively linked to the IMS communication environment 150 over network 140. The communication nodes 110 can each include a user 112-116 using a communication interface 131-134 of a communication device 122-126. Different users 112-116 can participate in a real-time conference session using interfaces 131-134 having user selected modalities. The interfaces 131-134 can include a voice interface 131, an audio video interface 132, a text exchange interface 133, a Web interface 134, and the like.

A session manager 152 can handle session specific details for environment 150. A conferencing engine 154 can be used to handle conference specific operations. Membership in the conference session can be specified by the list management server 156. More specifically, a conference table 160 and a participant table 170 can include conference specifics. The conference table 160 can include conference specific elements, such as conference ID 162, a start time 163, a conference owner 164, a conference status 165, comments 166, and the like. The participant table 170 can include participant specific elements, such as participant ID 172, participant name 173, device type 174, modality 175, status 176, comments 177, and the like. The conference ID 172 and participant ID 172 can be formatted as Uniform Resource Identifiers (URIs). A one-to-many relationship can exist between table 160 and table 170. Additionally, the list management server 156 can support conference group nesting, where a participant ID 172 can be a group identifier for a group defining a set of participants.

Figure 2:
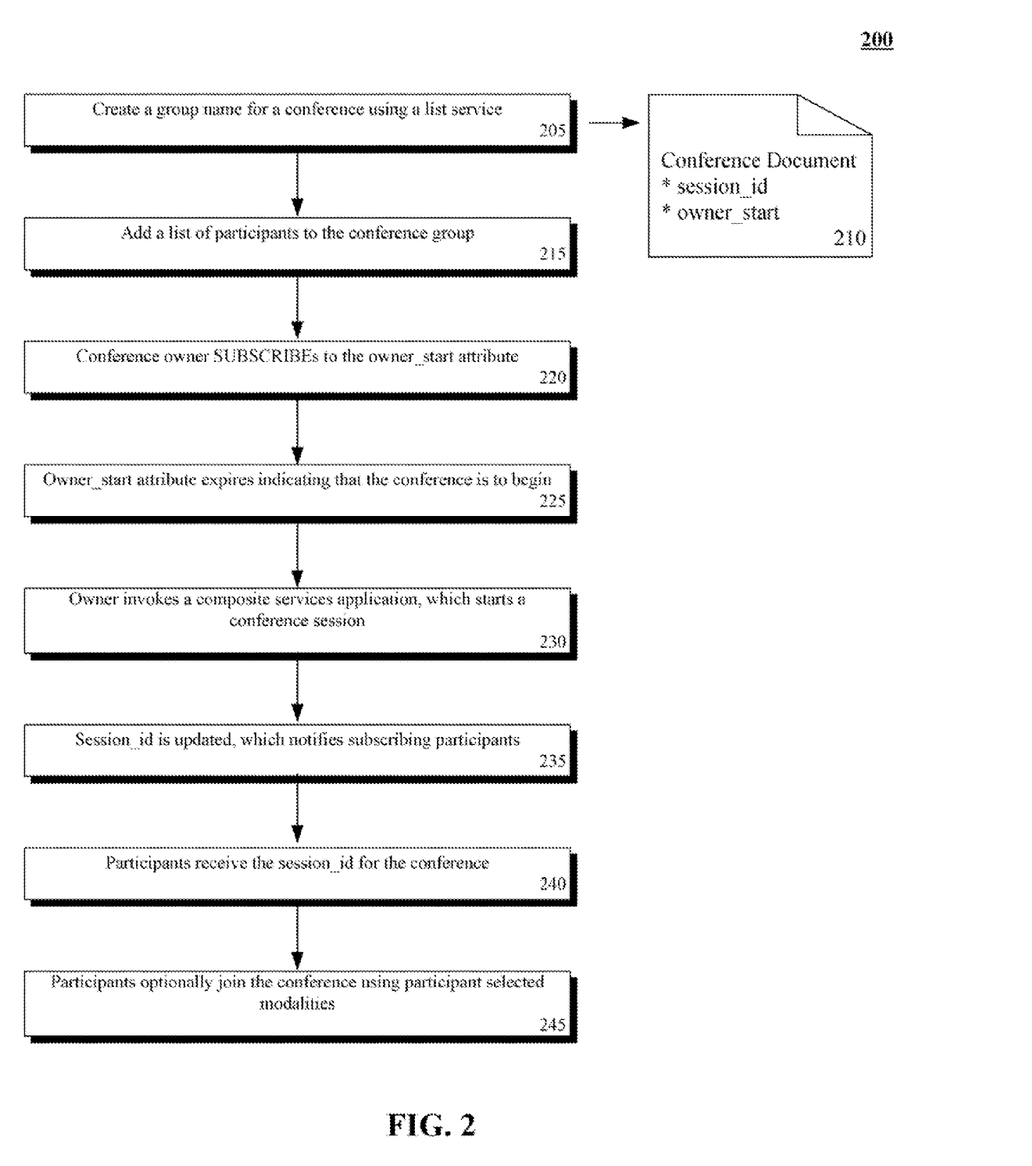
FIG. 2 is a flow chart of a method for using a list management server to determine conference participants in accordance with an embodiment of the inventive arrangements disclosed herein.

The elements and format of table 160 and 170 are not intended to be comprehensive or definitive and are presented to illustrate one contemplated arrangement for system 100. Different elements than those listed can be used and the invention can be implemented without utilizing all for the elements of tables 160, 170. Generally, table 160, 170 are used to show that conference specifics can be specified within a list management server 156 and that the list management server 156 can be used for conferencing purposes. FIG. 2, for example, uses slightly different attributes than those shown in tables 160 and 170.

As used herein, the communication node 110 can include a communication participant and hardware used by the participant. Each communication device 122-126 can be any computing device capable of exchanging messages over network 140. The communication devices 122-126 can include, but are not limited to, a standard telephone, a SIP based telephone, a mobile telephone, a computer, a two-way radio, a personal data assistant, a media player, an video game entertainment system, a chat terminal, a wearable computing device, and the like. Various ones of the communication devices 122-126 can be capable of different communication modalities. For example, a computer (device 122-126) can be able to communicate using a Voice Over Internet Protocol (VOIP) phone (e.g., voice interface 131), a text exchange interface 133, a Web interface 134, a video teleconferencing interface 132, and the like.

The voice interface 131 can be any interface that permits any real-time or near real-time voice content to be communicated. The voice content can be initially conveyed in a packet based or a circuit based format. The audio video interface 132 can be any interface through which video and/or audio content is conveyed. The audio-video interface 132 can include unidirectional interfaces as well as bidirectional ones. The text exchange interface 133 can be an interface through which real-time text messages are conveyed. Text exchange interface 133 can include a text messaging interface, a chat interface, an instant messaging interface, and the like. The Web based interface 134 can be an interface through which interactive Web content can be conveyed. The Web based interface 134 can include a Web form based interface, a shared desktop interface, a co-browsing interface, and the like.

In one embodiment, one or more of the communication devices 122-126 can use a multimodal interface. In another embodiment two or more communicatively linked single modality interfaces can be used by a single user 112 during a communication session. For example, in a contact center scenario, a contact center agent (e.g., one of users 112-116) can use a Web interface 134 to display contact center information while using a SIP based phone 131 to communicate with a live caller.

The IMS communication environment 150 is an architectural framework for delivering IP multimedia services to end users. The IMS communication environment 150 enables person-to-person and person-to-content communications in a variety of modes, including voice, text, pictures, video, and the like. The IMS is an international, recognized standard that was originally specified by the Third Generation Partnership Project (3GPP/3GPP2) and is currently being embraced by other standards bodies including the European Telecommunications Standard Institute (ETSI). The IMS communication environment can be a standards based Service Oriented Architecture (SOA) environment. The IMS communication environment 150 can be a composite services environment, where a modality used to communicate during a communication session is abstracted or decoupled from other session controlling elements, such as conferencing applications executing for the communicating session.

The session manager 152 can manage session state information, can connect/disconnect session participants, can handle call control functions, and the like. Session specific information used by the session manager 152 can be stored in data store 153. The conferencing engine 154 can manage conference specifics and can execute conference applications. Data store 155 can be accessible by engine 154 and can include information used by engine 154.

The list management server 156 can allow for the creation and management of network-based group definitions and associated lists for members of those groups. These lists can include conferencing lists and conferencing participant lists (e.g., table 160 and 170), which can be stored in data store 157. The list management server 156 can operate in accordance with numerous open standards, such as an (XML) Configuration Access Protocol (XCAP) based standard, an open mobile alliance (OMA) XML Document Management Server (OMA XDMS) based standard, and the like. The list management server 156 can be implemented using numerous commercially available solutions, such as the GROUP LIST MANAGEMENT SERVER (GLM) for IBM IMS. The invention is not limited to being implemented in this fashion, however, and other solutions can be used including the NOKIA LIST MANAGEMENT SERVER, the HP OPENCALL XML DOCUMENT MANAGEMENT SERVER, and the like.

Network 140 can include any hardware/software/and firmware necessary to convey data encoded within carrier waves. Data can be contained within analog or digital signals and conveyed through data or voice channels. Network 140 can include local components and data pathways necessary for communications to be exchanged among computing device components and between integrated device components and peripheral devices. Network 140 can also include network equipment, such as routers, data lines, hubs, and intermediary servers which together form a data network, such as the Internet. Network 140 can also include circuit-based communication components and mobile communication components, such as telephony switches, modems, cellular communication towers, and the like. Network 140 can include line based and/or wireless communication pathways.

As used herein, presented data stores, including stores 153, 155, and 157, can be a physical or virtual storage space configured to store digital information. Data stores 153, 155, and 157 can be physically implemented within any type of hardware including, but not limited to, a magnetic disk, an optical disk, a semiconductor memory, a digitally encoded plastic memory, a holographic memory, or any other recording medium. Each of the data stores 153, 155, and 157 can be a stand-alone storage unit as well as a storage unit formed from a plurality of physical devices. Additionally, information can be stored within data stores 153, 155, and 157 in a variety of manners. For example, information can be stored within a database structure or can be stored within one or more files of a file storage system, where each file may or may not be indexed for information searching purposes. Further, data stores 153, 155, and 157 can utilize one or more encryption mechanisms to protect stored information from unauthorized access.

FIG. 2 is a flow chart of a method 200 for using a list management server to determine conference participants in accordance with an embodiment of the inventive arrangements disclosed herein. Method 200 can be performed in the context of system 100 or other communication system where a list management server defines conference membership.

Method 200 can begin in step 205, where a group name can be created for a conference using a list service of a list management server. The conference group can have a number of attributes, such as those shown in table 160. Two of the attributes can include an owner_start attribute and a session_id attribute, as shown by document 210. A composite services application can be created and/or (an existing) composite services application can assigned for the conference.

In step 215, a list of conference participants can be added to the conference group. Each participant can be associated with a participant specific URI, which can represent a resource (e.g., communication device) used by an associated participant. Each participant can SUBSCRIBE (i.e., a SIP based SUBSCRIBE operation) to the session_id attribute of the conference group. In step 220, a conference owner can SUBSCRIBE to the owner_start attribute's expiration characteristic. The conference owner can be the only participant authorized to subscribe to this attribute. Expiration of the owner_start attribute can correspond to the start of the conference specified by the conference group.

In step 225, the owner_start attribute can expire, which indicates the conference is to begin. The list management server can NOTIFY the conference owner when of the conference is to begin (e.g., owner_start expiration time). Normal list management server mechanisms can be used at this stage, where the list management server traverses the URI list of participants associated with the conference group for SUBSCRIBErs of the affected attribute, which in this case is the owner_start attribute.

In step 230, the owner can invoke the composite services application, which starts the conference session. At this point, the session_id can be updated with the session identifier of the composite services application. Updating the session_id attribute, causes a change event associated with the session_id to fire, as shown in step 235. When the session_id fires, the list management server can traverse the URI list in the conference group for SUBSCRIBErs to the session_id attribute. Each conference participant can be NOTIFIED of the attribute change. In step 240, each participant can receive the session ID. This NOTIFY message can be received in a modality and by a device chosen by each participant. In step 245, each participant can choose whether to join the conference session. Different participants can join in different modalities, each participant receiving real-time messages from other participants in their chosen modality.

Figure 3:
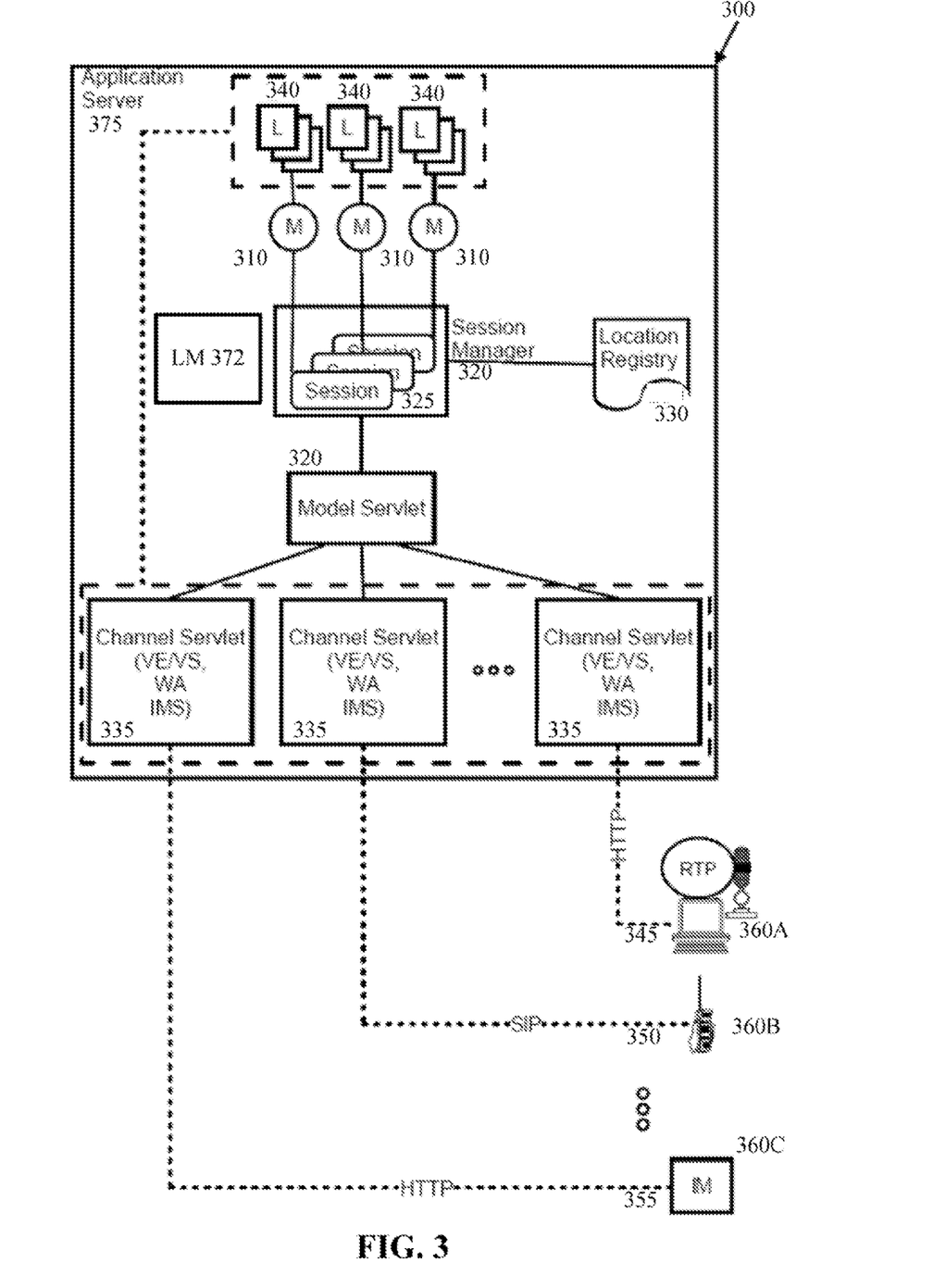
FIG. 3 is a schematic diagram of a composite services system that uses a list management server to specify conference membership in accordance with an embodiment of the inventive arrangements disclosed herein.

FIG. 3 is a schematic diagram of a composite services system 300 that uses a list management server 372 to specify conference membership in accordance with an embodiment of the inventive arrangements disclosed herein. System 300 can represent one particular embodiment of system 100.

In the composite services environment 300, different channels of access to a service can be established for accessing a service through corresponding different modalities of access including voice and visual (e.g., Web and/or Text Exchange) modes. Modalities can be defined on a participant-by-participant (e.g., client-by-client) basis, such as by defining a communication modality within the list management server 372, as indicated by modality element 175 of FIG. 1. A service can be concurrently accessed by different clients using different communication channels. Specifically, interactions with a service within a communication session can be provided across selected ones of the different communication channels, each channel corresponding to a different modality of access to the service. In the case of a voice modality and a visual modality, a separate markup document can be utilized in each selected channel according to the particular modality for that channel.

Importantly, each channel utilized for accessing a service within a session can be associated with each other channel accessing the service within the same session. The session can represent a conference involving two or more participants. In consequence, the state of the service—stored within a model in a model-view-controller architecture—can be maintained irrespective of the channel used to change the state of the service. Moreover, the representation of the service can be synchronized in each view for the selected ones of the different channels. As such, an end user can interact with the service in a single session across different channels of access using different modalities of access without requiring burdensome, proprietary logic deployed within a client computing device.

As illustrated, composite services can operate in an application server 375 and can include multiple channel servlets 335 configured to process communicative interactions with corresponding sessions 325 for a composite multimedia service over different channels of access 345, 350, 355 for different endpoint types 360A, 360B, 360C in a communication network. Each endpoint 360A, 360B, 360C can represent a conference session participant. The channel servlets 335 can process voice interactions as a voice enabler and voice server to visual endpoint 360A incorporating a voice interface utilizing the Real Time Protocol (RTP) and Hypertext Transmission Protocol (HTTP), or a voice endpoint 360B utilizing Session Initiated Protocol (SIP). Likewise, the channel servlets 335 can process visual interactions as a Web application to a visual endpoint. As yet another example, the channel servlets 335 can process instant message interactions as an instant messaging server to an instant messaging endpoint 360C.

More specifically, the channel servlets 335 can be enabled to process HTTP requests for interactions with a corresponding session 325 for a composite multimedia service. The HTTP requests can originate from a visual mode oriented Web page over a visual channel 345, from a visual mode oriented text exchange interface over a text exchange channel 355, or even in a voice mode over a voice channel 350 enabled by SIP. The channel servlets 335 can be enabled to process SIP requests for interactions with a corresponding session 325 for a composite multimedia service through a voice enabler which can include suitable voice markup, such as Voice XML and call control extensible markup language (CCXML) coupled to a SIPlet which, in combination, can be effective in processing voice interactions for the corresponding session 325 for the composite multimedia service, as it is known in the art.

Each of the channel servlets 335 can be coupled to a model servlet 320. The model servlet 320 can mediate interactions with a model 310 for an associated one of the sessions 325. Each of the sessions 325 can be managed within a session manager 320 which can correlate different channels of communication established through the channel servlets 335 with a single corresponding one of the sessions 325. The correlation of the different channels of communication can be facilitated through the use of a coupled location registry 330. The location registry 330 can include a table indicating a host name of systems and channels active for the corresponding one of the sessions 325. Location registry 330 can receive conference participation information from the list management server 372. In one contemplated embodiment, the location registry 330 itself can be part of the list management server 372. That is, the list management server 372 can be used to host names of systems, clients, and channels for composite service communications in general and not just for specifying membership of conferencing sessions.

The model servlet 320 can include program code enabled to access a model 310 for a corresponding session 325 for a composite multimedia service providing different channels of access 345, 350, 355 through different endpoints 360A, 360B, 360C. For instance, the model 310 can be encapsulated within an entity bean within a bean container. Moreover, the model 310 can store session data for a corresponding one of the sessions 325 irrespective of the channel of access 345, 350, 355 through which the session data for the corresponding one of the sessions 325 is created, removed or modified.

Notably, changes in state for each of the sessions 325 for a composite multimedia service can be synchronized across the different views 360 for the different channels of access 345, 350, 355 through a listener architecture. The listener architecture can include one or more listeners 340 for each model 310. Each listener can correspond to a different channel of access 345, 350, 355 and can detect changes in state for the model 310. Responsive to detecting changes in state for the model 310 for a corresponding one of the sessions 325 for a composite multimedia service, a listener 340 can provide a notification to subscribing view 360 through a corresponding one of the channel servlets 335 so as to permit the subscribing views 360 to refresh and incorporate the detected changes in state for the model 310.

Figure 4:
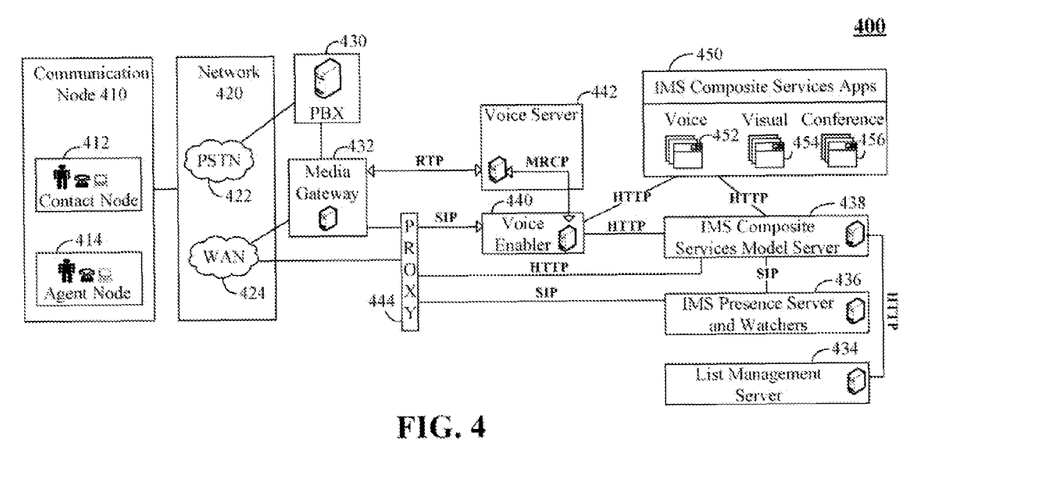
FIG. 4 is a schematic diagram of a contact center system that includes conferencing capabilities where conference membership is controlled by a list management server in accordance with an embodiment of the inventive arrangements disclosed herein.

FIG. 4 is a schematic diagram of a contact center system 400 that includes conferencing capabilities where conference membership is controlled by a list management server in accordance with an embodiment of the inventive arrangements disclosed herein. System 400 can represent one embodiment of system 100. The contact center system 400 can be an open contact center that includes components that interact based upon open standards. For example, conference management can be conducted using the list management server 434 that uses Extensible Markup Language (XML) based messaging, such as XCAP messaging.

Use of open standards indicates that specifics of communication protocols, interfaces with components of the open contact center, and the like, are published and available to third party vendors who can construct solutions or enhancements to the open contact center by conforming to the published standards. Open standards can include, but are not limited to, XML based standards, XCAP based standards, service-oriented architecture (SOA) based standards, RTP based standards, Media Resource Control Protocol (MRCP) based standards, HTTP based standards, SIP based standards, and the like. Open standards are often established by an independent standard setting body, such as the Internet Engineering Task Force (IETF), World Wide Web Consortium (W3C), etc., or by a cooperating consortium of multiple independent businesses, such as IBM, Sun Microsystems, and the like. Open standards, as used herein, can exist even though one or more companies maintains intellectual property rights to open contact center concepts, such as those presented in the instant application.

In system 400, a communication node 410 of a caller (e.g., contact node 412) and/or an agent (e.g., agent node 414) are linked to network 420. Network 420 can include Public Switched Telephone Network (PSTN) components 422 and wide area network (WAN) 424 components. The PSTN 422 can interface with a Private Branch Exchange (PBX 430) which routes calls to media gateway 432. The media gateway 432 can interact with the voice server 442 and the voice enabler 440 using open standards, such as RTP based standards and MRCP based standards. Call provisioning applications (e.g., CCXML based applications) can be used for call provisioning (e.g., DNIS to VXML application) functions.

System 400 can utilize an IMS composite services model server 438 to handle IMS composite services applications 450, which can replace single modality applications commonly used in legacy contact centers. The composite services applications 450 can include voice applications 452, visual applications 454, and conference applications 456. The conference applications 456 can base conference membership upon a set of participants defined and managed by list management server 434.

The contact node 412 and the agent node 414 can each interact with the contact center using many different modalities, such as voice, instant messaging, Web form interactions during sessions, and the like. Each communication node 410 can interface using standard hardware and software, such as SIP phone and Web browser with LOTUS Lightweight Messaging (LWM) and Blocks Extensible Exchange Protocol (BEEP). Asynchronous JavaScript and XML (AJAX) and HTTP or other communication techniques for exchanging information with the agent node 414 can be used in place of LWM and BEEP. WEBSPHERE PS and agent portlets can be used to interface with the Web browser for added scalability and security.

IMS presence server and watchers 436 can be used in system 400 to detect available agents and their skills and to monitor contact center interactions. In one embodiment, collaboration components can be implemented using IBM WORKPLACE or other such components. The voice enabler 440 can be implemented using IBM's VOICE ENABLER, the voice server 442 can be implemented using WEBSPHERE voice server, the proxy 444 can be implemented using WAS EDGE SERVER LOAD BALANCER or WAS SIP PROXY, and the list management server 434 can be implemented using GROUP LIST MANAGEMENT (GLM) server for IBM IMS.

It should again be emphasized that although component implementation specifics for one contemplated embodiment have been described using IBM WEBSPHERE middleware, the invention is not so limited. Any middleware solution or standards based solution can be used in place of the IBM WEBSPHERE specific components described herein, using adaptations and software techniques commonly performed by software engineers and developers, which do not require undue experimentations or inventive efforts. For example, WEBSPHERE components can be replaced by components from a different software platform, such as BEA WEBLOGIC application server from BEA Systems, Inc. of San Jose, Calif., a JBOSS application server from JBOSS, Inc. of Atlanta, Ga., a JOnAS application server from the ObjectWeb Consortium, the .NET software platform, and the like.

Figure 5:
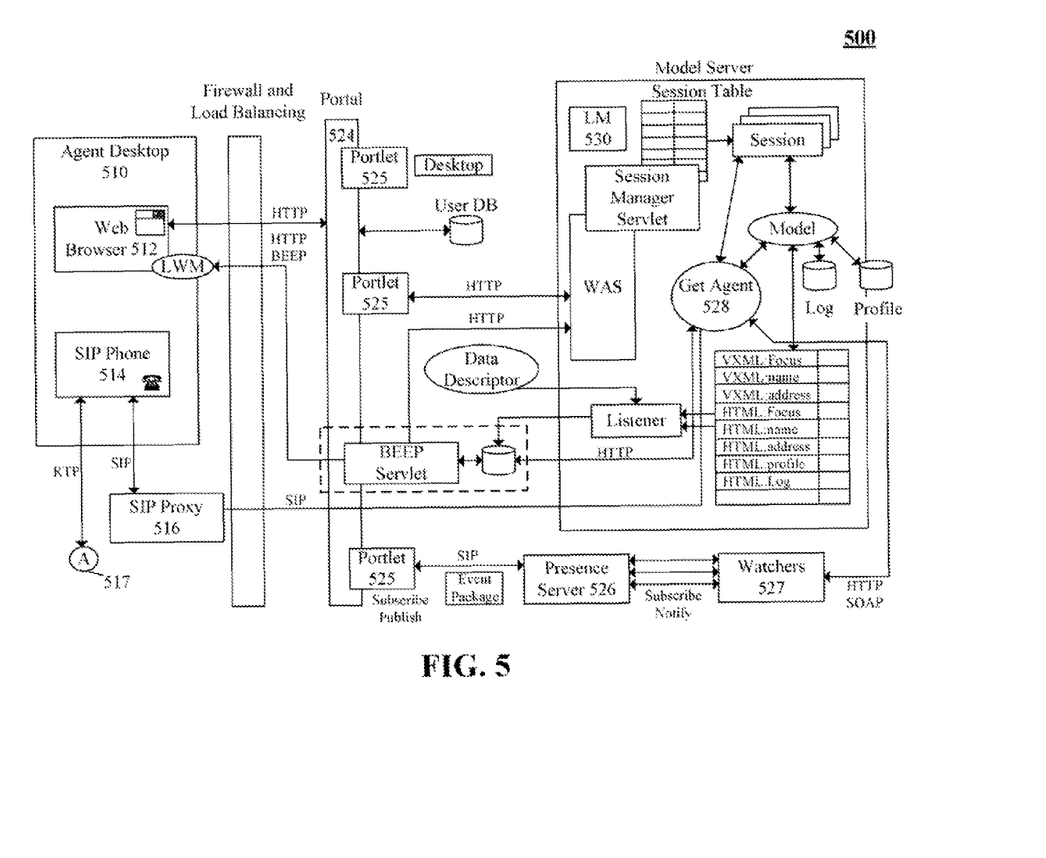
FIG. 5 is a schematic diagram of a standards based contact center from an agent perspective that is implemented using WEBSPHERE enabled components and associated tooling in accordance with an embodiment of the inventive arrangements disclosed herein.

FIG. 5 is a schematic diagram of standards based contact center 500 from an agent perspective that is implemented using WEBSPHERE enabled components and associated tooling in accordance with an embodiment of the inventive arrangements disclosed herein. Center 500 represents one particular embodiment for system 100, where list management server 530 is used to specify participants of contact center conferences. It should be noted that center 500 utilizes WEBSPHERE enabled components for illustrative purposes only and the scope of the invention is not to be construed as limited in this regard. Other middleware solutions and open standards based solutions can be substituted and adapted to achieve approximately equivalent results.

An illustrative scenario for center 500 can show how the components interact. In this scenario, a call can come in over a telephone to the contact center 500 using a standard telephone, where the call is transferred to an agent connected to contact center components using agent desktop 510. The agent can utilize any personal computer in an operations center as the agent desktop 510 and is not trained to a particular station. The agent can also remotely (i.e., external to an operations center, such as through a home computer) connect to contact center components using a Web browser 512 and SIP based telephone 514. The agent can sign onto portal 524 via an agent desktop portlet 525. For example, the agent can enter a user id and password and hit a SUBMIT button.

The desktop agent portlet can call the WEBSPHERE PRESENCE SERVER (WPS) 526 with a publish/subscribe mechanism. An IP address of the agent's SIP phone 514, browser 512, Blocks Extensible Exchange Protocol (BEEP) address, and other information including agent expertise and agent utilization can be conveyed to the presence server 526. After login onto the system, a default screen can be presented in the browser 512 that indicates that the agent is active and available.

It should be emphasized that use of a LOTUS Lightweight Messaging (LWM) client and the BEEP protocol is just one contemplated technique for communicating with the agent desktop and that the invention is not to be limited in this regard. That is, any of a variety of other techniques can be substituted that provide approximately equivalent function to LWM and BEEP. For example, Asynchronous JavaScript and XML (AJAX) based clients using HTTP can establish communications with the agent desktop in one contemplated embodiment.

Watchers 527 can be plugged into the presence server 526 for items of interest to the contact center. One item of interest can be agent expertise and there can be a one-to-one correspondence between watchers 527 and expertise. When the agent logs onto the contact center 500, he/she registers with the presence server 526. The presence server 526 can update watcher 527 information so that those watchers associated with expertise(s) of the logged in agent are informed that a new agent having this expertise is available for receiving calls.

At this time, a call between a caller on a phone and the contact center 500 can be active. In a running Voice XML (VXML) application, the WEBSPHERE Voice Enabler (VE) can prompt a user for input. The VE can interact with the WEBSPHERE VOICE SERVER to determine user context information and a purpose of a call. The purpose of the call can be associated with an expertise category. The caller responses can indicate that agent assistance is needed. For example, a caller can select a dialog option to speak with a live agent.

The VXML application can transfer the caller to an agent transfer servlet co-located with the SIP proxy 516. For example, the get agent 528 function can be executed for a particular expertise, such as "expertise=1". A watcher 527 associated with expertise=1 can be contacted. A further filter (i.e., a load balancing filter) can be applied to the watcher 527 that filters based on usage criteria. For example, the least used agent can be granted priority by the load balancing filler. Other load balancing filters can be used and the invention is not to be construed as limited in this regard.

For instance, filters for selecting an agent having the needed expertise can utilize criteria of any complexity. Filtering criteria can include, but is not limited to, a length of time of an agent in a watcher list, a category of watcher (i.e., dedicated agent or independent knowledge broker), a customer satisfaction rating for interactions with the agent, a skill level in the expertise category of the agent, an estimated wait time for an agent based upon a current queue, and the like. Accordingly, contact centers can customize agent selection in numerous business specific manners to improve customer satisfaction, to decrease costs to a business, to minimize wait time, and/or to achieve other business objectives.

Once the transfer is made, the agent can receive the call using the SIP phone 514 and can receive caller specific data via the browser 512. The communication can include the SIP proxy 516 and/or a RTP connection direct to the caller 517. The received call can be a conference call involving multiple other parties. Participants of the conference call can be defined by the list management server 530. For example, a URL for the SIP phone 514 and/or Web browser 512 of the contact center agent can be stored in an identification field (e.g., participant ID 172) of the list management server 530 in conformance with an XCAP or other standard.

It should be noted that middleware programming interface of contact center 500 allows for custom services to be created for contact center operations. These services can be provided by the middleware provider and/or by third party providers, which include traditional vendors of contact center solutions. The presence server 526 subscription function permits the dynamic registration of agents and agent capabilities. Further, the rich presence function of the server 526 can permit real-time status metrics on agent operations. Generally, contact center 500 encourages the interoperation of services provided by different sources, which permits the contact center 500 to gracefully evolve and to use best practices and applications tailored to the specific needs of the business or organization for which the contact center 500 is implemented.

Further, the arrangements of contact center 500 permit knowledge brokering and independent agent services to be provided to a multitude of business entities. That is, agents can operate as independent knowledge brokers, who sell their knowledge and services in a manner analogous to how goods/merchandise is sold today. Thus, contact center 500 can connect people with knowledge to sell, such as doctors, lawyers, and other professionals, to those willing to pay for this knowledge (i.e., callers or communicators contacting the call center). Businesses can utilize these independent contractors to handle difficult problems that dedicated staff is unable to handle, to handle overflow to ensure that queue wait times remain under a configurable duration, and to offer an unprecedented level of contact center flexibility. The open standards based nature of center 500 permits the seamless integration of independent knowledge brokers and dedicated personnel in a fashion transparent to callers. In short, higher quality contact center services can be provided at less costs using center 500 than is possible using conventionally implemented contact centers.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for conferencing in an IP Multimedia Subsystem (IMS) environment comprising:
    establishing a conference group with a list management server, wherein the conference group includes a plurality of attributes, said attributes including a session identifier and an owner start attribute;
    a plurality of conference participants subscribing to the session identifier, wherein one of the conference participants is a conference session owner, the conference session owner subscribing to the owner start attribute;
    the owner start attribute automatically triggering an event at approximately a time that the conferencing session is to start;
    the list management server conveying a notification to the conference session owner in response to the triggering;

responsive to notifying the conference session owner, invoking a conference application to initiate a conferencing session, which has an associated conferencing session identifier;

the conference application changing a value of the session identifier to the conferencing session identifier; and responsive to the changing step, the list management server automatically conveying a notification of the change that includes the conferencing session identifier to the subscribed conference participants, wherein said conference participants are able to join in the conferencing session by responding to a received notification.

2. The method of claim 1, wherein each subscribing participant subscribes using a SIP compliant SUBSCRIBE operation, and wherein the conveying of the notification uses a SIP compliant NOTIFY operation.

3. The method of claim 1, wherein each conference participant is associated with a participant specific Uniform Resource Identifier (URI), which is managed by the list management server.

4. The method of claim 3, wherein a record for each conference participant is maintained by the list management server, said records each having a modality attribute, said modality attribute indicating a modality through which the associated conference participant will participate in the conferencing session.

5. The method of claim 1, wherein the conference is a contact center conference, wherein the conference participants include at least one call center agent and at least one caller, wherein the list management server is one of a plurality of contact center components conforming to open standards that intercommunicate utilizing open standards, said components together forming an open contact center, said open contact center providing automated interactive communications with callers, providing queue management for callers waiting to communicate with live agents, providing skills based routing for assigning live agents to callers based upon skills of the live agents and skills needed by the callers, providing conferencing capabilities, and providing tooling for provisioning and monitoring the live agents.

6. A system for real-time communications comprising:

a list management server which creates and manages network-based group definitions and associated lists of members of those groups, each group having a plurality of attributes including a session identifier and an owner start attribute, wherein said list management server manages communication groups comprising a plurality of communication participants each associated with a real-time communication device having a unique Uniform Resource Identifier (URI), which is used by the list management server to identify the associated communication participant; and at least one composite services application configured to initialize a real-time communication session responsive to the owner start attribute triggering an event at approximately a time that the communication is to begin, the communication session having participants specified by the list management server, wherein the real-time communication system uses open standards to extend composite services to allow multi-user access;

wherein each communication participant subscribes to the session identifier for a communication group that the communication participant is a member of, and wherein when initialized the composite services application changes the session identifier to a value of an initialized communication session, which causes the list management server to notify each subscribing communication participant so that each is able to join the initialized communication session.

7. The system of claim 6, wherein the communication groups are conference groups, wherein the communication participants are conference session participants, wherein the real-time communication session is a conference session, wherein each of the at least one composite services application is a conferencing application.

8. The system of claim 6, wherein the list management server manages a communication participant selectable modality, which represents the modality that the communication participant uses during a communication session corresponding to a communication group of which the communication participant is a member.

9. The system of claim 6, wherein the list management server is one of a plurality of contact center components conforming to open standards that intercommunicate utilizing open standards, said components together forming an open contact center, said open contact center providing automated interactive communications with callers, providing queue management for callers waiting to communicate with live agents, providing skills based routing for assigning live agents to callers based upon skills of the live agents and skills needed by the callers, providing conferencing capabilities, and providing tooling for provisioning and monitoring the live agents.

10. A method of conferencing communication participants in a conference session, comprising:

creating within a list management server conference group having a plurality of attributes including a session identifier and an owner start attribute, wherein the session identifier is a Uniform Resource Identifier (URI) unique within the list management server;

associating a plurality of participant identifiers with the conference session identifier, wherein each of the participant identifiers is a Uniform Resource Identifier (URI) unique within the list management server and wherein one of the participants is a conference session owner, the conference session owner is further associated with the owner start attribute;

the owner start attribute automatically triggering an event at approximately a time that the conferencing session is to start;

the list management server conveying a notification to the conference session owner in response to the triggering; and executing a conference application and associating a conference session identifier with the conference session responsive to the triggering, wherein the conference application changes a value of the session identifier to the conference session identifier and initiates the conference session that includes a participant for each of the participant identifiers by conveying a notification of the change including the conference session identifier to the participants.

11. The method of claim 10, wherein the conference is a contact center conference, wherein the conference participants include at least one call center agent and at least one caller, wherein the list management server is one of a plurality of contact center components conforming to open standards that intercommunicate utilizing open standards, said components together forming an open contact center, said open contact center providing automated interactive communications with callers, providing queue management for callers waiting to communicate with live agents, providing skills based routing for assigning live agents to callers based upon skills of the live agents and skills needed by the callers, providing conferencing capabilities, and providing tooling for provisioning and monitoring the live agents.

12. The method of claim 10, wherein the conference application is a composite services application, and wherein each of the participants is able to join the conference using a participant selected modality.

13. The method of claim 10, further comprising:
associating a group identifier with the conference session identifier, wherein the group identifier is a Uniform Resource Identifier (URI) unique within the list management server, and wherein the group identifier identifies a group of conference participants, each of which is identified with a participant identifier that is a Uniform Resource Identifier (URI) unique within the list management server.

14. The method of claim 10, wherein the list management server exchanges messages with external computing components using an XML based standard, wherein the conference session identifier and the plurality of participant identifiers are initially specified within markup documents conforming to the XML based standard, and wherein the list management server extracts information that it manages for the conference from the markup documents.

15. The method of claim 14, wherein the XML based standard is an XML Configuration Access Protocol (XCAP) based standard.

16. The method of claim 10, further comprising:
providing said owner start attribute with an expiration corresponding to a start time of the conference, wherein the executing step is initiated by the expiration of the owner start attribute.

17. The method of claim 10, wherein the conference is initiated within an IP Multimedia Subsystem (IMS) communication environment.

18. The method of claim 17, wherein a Session Initiated Protocol (SIP) based SUBSCRIBE operation is performed to permit each participant to join the conference.

* * * * *